United States Patent Office 3,374,834
Patented Mar. 26, 1968

3,374,834
SOIL STABILIZATION AND GROUTING METHOD
Joseph Ramos and Roger F. Rensvold, Duncan, Okla.,
assignors to Halliburton Company, Duncan, Okla., a
corporation of Delaware
No Drawing. Filed Oct. 31, 1966, Ser. No. 590,537
12 Claims. (Cl. 166—33)

The present invention relates to a new and improved method of stabilizing soil, consolidating loose sands, grouting, and bridging or plugging openings of vugular and/or fractured earth formations.

The invention especially relates to an improved suspending agent for inert fillers contained in chemical grouting slurries.

An important object of the present invention is to provide a new and improved soil stabilization and/or grouting slurry comprising a consolidating fluid, finely divided inert or non-reactive solids and a suspending agent for the solids.

Another object of the present invention is to provide an improved chemical grouting slurry containing a consolidating fluid, finely divided inert solids and a suspending agent such as attapulgite clay, finely chopped asbestos fibers or other similar materials.

Other objects and advantages of the present invention will be readily apparent to those skilled in the art upon consideration of the detailed disclosure hereinbelow.

The present invention is an improvement over U.S. Patent No. 3,223,163, specifically incorporated herein by reference thereto.

Soil properties, surrounding environment and general job conditions quite frequently require that the grouting or consolidating fluid contain finely divided, inert fillers or solids. Such fillers may be silica flour, talc, scoria, barites, bauxite, calcium carbonate, asphaltic pyrobitumens, gilsonite and the like. Silica flour or finely ground sand is a preferred filler.

For chemical grouting operations or other injection methods wherein small volumes of consolidating fluid and low pumping or injection rates are used, the solids may fall out or settle out of the fluid before the fluid can be properly placed. As most grouting or soil stabilization jobs require a uniform concentration of fillers or solids, it is important that the solids remain in suspension during pumping or injection.

It has been customary heretofore to use bentonite, a highly adsorptive montmorillonite clay as the suspending agent to prevent premature or excessive settling of the filler or solids from occurring, either in tanks used to mix the grouting slurry or in the injection lines. Bentonite is undesirable for several reasons. Relative large concentrations are required. Different concentrations are required for each of the two fluid components in a two-stream grouting method in order to maintain equal apparent viscosities. Hydration of the bentonite which is time consuming, is necessary before its maximum suspending properties are realized.

It has been discovered that certain materials having needle-like crystals possess suspending properties superior to those of bentonite. Palygorskite clays such as attapulgite and asbestos such as chrysotile are examples of these materials which are hydrous oxides of silicon, magnesium and/or aluminum, characterized by a needle-like or acicular mode of crystallization, with densities ranging from 2.5 to 2.7 grams per cubic centimeter, and specific surface area of from approximately 4 to 150 square meters per gram. Two commercial forms of these materials, Attapulgus 150, a refined attapulgite clay and Flosal, finely chopped asbestos fibers, have been found to be particularly beneficial as suspending agents.

The physical and chemical characteristics of these materials are as follows:

| Chemical Composition | Percent by Weight (approximate) | |
|---|---|---|
| | Attapulgite Clay | Asbestos (Chrysotile) |
| $SiO_2$ | 67.0 | 37–44 |
| $MgO$ | 11.0 | 39–44 |
| $FeO$ | | 0–6 |
| $Fe_2O_3$ | 4.0 | 1–5 |
| $Al_2O_3$ | 12.5 | 0.2–1.5 |
| $CaO$ | 2.5 | Trace to 5 |
| Other | 3.0 | |
| Surface Area, m.²/gm | 150 | 4–12 |
| Density, gm./cc | 2.5–2.7 | 2.5–2.6 |
| Crystal diameter, millimicrons | 10–50 | 200 |

Empirical formula $(OH_2)_4(OH)_2Mg_5Si_8O_{20}.4H_2O Mg_6(OH)_8Si_4O_{10}$

The consolidating slurry or grouting fluid of the present invention comprises principally a water soluble prepolymer or polymerizable gelling material or a chrome lignin material.

Some examples of water soluble gels or gel-forming compositions which may be employed in the present invention are the sodium silicate gels, a polymerizable mixture of an ethenoid monomer containing an acrylyl group, and a chrome lignin gel. These gelling compositions or materials may be prepared as disclosed in U.S. Patent No. 3,223,163 or by other methods known to those skilled in the art. This invention is, of course, not limited to any particular way of preparing the gelling material. It is understood, also, that the gelling material contains a suitable catalyst or has a catalyst applied thereto, so that the desired gelling of the material can take place. The use of catalysts for setting these gels is well known in the art, and this invention is not limited to any particular catalyst or method of setting the gelling material.

An ethenoid monomer of the following structure is particularly illustrative of an acrylic pre-polymer used in the present invention:

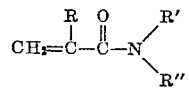

where R is either H or $CH_3$, R' is either H or an alkyl group and R" is either H or an alkyl group. Numerous specific examples of these compounds are disclosed in the aforesaid patents, among which are included a mixture of 95%–99% acrylamide and 1%–5% N,N' methylene bis-acrylamide. A suitable catalyst such as ammonium persulfate or others is also included with this type of gelling material.

In using an organic solid particle such as finely divided gilsonite or an asphaltic pyrobitument or the like, a suitable surfactant must also be added to the grouting or stabilizing slurry to suspend the solids therein. Any surfactant which lowers the surface tension of the grouting solution, is effective for this purpose. Sodium tetradecyl sulfate and a trimethyl nonyl ether or polyethylene glycol have been found to be particularly effective with these organic materials. It has also been discovered that the surfactant may be nonionic, anionic or cationic.

The solids or fillers of the present invention are preferable of a particle size between about 10 and about 180 microns and present in an amount between about .15 to 1.25 gallons per gallon of grouting or consolidating solution based on absolute gallons.

Some laboratory tests showing the unique suspending properties of the suspending agents of this invention are set forth hereinbelow.

PROCEDURE

Slurries were prepared using various increments of the different suspending agents tested. All of the slurries were prepared using hand mixing techniques. Portions of each slurry were placed in a 50 cc. graduated cylinder. At 30 minute intervals a plunger was dropped through the slurry being tested. The amount of settling was determined by observing the level of the top of the plunger extending out of the graduate. Four readings were taken on a Fann VG meter for each slurry at 100, 200, 300, and 600 r.p.m.

In laboratory and field testing formulations the Attapulgus 150 was added to the water before the remaining chemicals were mixed.

The suspending agents which appeared best in laboratory tests were field tested in 5 gallon batches of AP and PWG slurries. A model HI-300, hand operated, grouting pump was used to determine the pump characteristics of these slurries.

MATERIALS

*Water soluble gelling material.*—GEL—10% solution of a polymerizable mixture comprising about 95% acrylamide and 5% N,N' methylenebisacrylamide.
*Finely divided solids.*—SOLIDS—silica flour.
*Catalyst.*—DAP—dimethyl amino propionitrile and AP—ammonium persulfate.
*Suspending agents.*—SA—Attaplugus 150–A—a finely divided attapulgite clay.
  Flosal–F—finely chopped asbestos particles
  BD—dry bentonite
  BW—10% prehydrated bentonite (by weight—90% water and 10% bentonite.)
*Water.*—W—tap water.

DATA

TABLE I.—FORMULATIONS

| Form. No. | Materials Used | | | | | |
|---|---|---|---|---|---|---|
| | GEL (gms.) | W (gms.) | DAP (cc.'s) | AP (gms.) | Solids (gms.) | SA (gms.) |
| 1 [1] | 33.2 | 168.8 | 1.85 | | 400.0 | 2.94 BD. |
| 2 | 33.2 | 139.4 | 1.85 | | 400.0 | 29.4 BW. |
| 3 [1] | | 200.0 | | 2.0 | 400.0 | 1.46 BD. |
| 4 | | 185.4 | | 2.0 | 400.0 | 14.6 BW. |
| 5 [2] | 33.2 | 168.8 | 1.85 | | 400.0 | 2.94 BD. |
| 6 [2] | | 200.0 | | 2.0 | 400.0 | 1.46 BD. |
| 7 | 33.2 | 168.8 | 1.85 | | 400.0 | See Table II. |
| 8 | | 200.0 | | 2.0 | 400.0 | Do. |
| 9 | 33.2 | 168.8 | 1.85 | | 400.0 | Do. |
| 10 | | 200.0 | | 2.0 | 400.0 | Do. |

[1] The water and dry bentonite in formulations 1 and 3 were hydrated in a Waring Blender for 30 minutes.
[2] In these formulations the bentonite was dry blended with the Solids prior to mixing.

TABLE II.—AMOUNT OF SETTLING IN A 50 CC. GRADUATE

| Formulation | Bentonite, percent | Attapulgus, percent | Flosal, percent | Settling (in.) | Time (min.) |
|---|---|---|---|---|---|
| 1 | 1.47 | | | 0 | 30 |
| | | | | 0 | 60 |
| | | | | 0 | 90 |
| | | | | 0 | 120 |
| 2 | 1.47 | | | 0 | 30 |
| | | | | 0 | 60 |
| | | | | 0 | 90 |
| | | | | 0 | 120 |
| 3 | .73 | | | 0 | 30 |
| | | | | 0 | 60 |
| | | | | 0 | 90 |
| | | | | 0 | 120 |
| 4 | .73 | | | 0 | 30 |
| | | | | 0 | 60 |
| | | | | 0 | 90 |
| | | | | 0 | 120 |
| 5 | 1.47 | | | Small | 30 |
| | | | | Moderate | 60 |
| | | | | Large | 120 |
| 6 | .73 | | | Small | 30 |
| | | | | Moderate | 60 |
| | | | | Large | 120 |
| 7 | | | | 5/8 | 30 |
| | | | | 1 1/2 | 60 |
| | | | | 2 1/2 | 90 |
| | | | | 3 3/4 | 120 |
| 7 | | | 1 | 0 | 30 |
| | | | | 1/4 | 60 |
| | | | | 5/8 | 90 |
| | | | | 5/8 | 120 |
| 7 | | | 1.5 | 1/2 | 30 |
| | | | | 5/8 | 60 |
| | | | | 5/8 | 90 |
| | | | | 5/8 | 120 |
| 7 | | | 1.75 | 0 | 30 |
| | | | | 0 | 60 |
| | | | | 1/8 | 90 |
| | | | | 1/4 | 120 |
| 7 | | | 2.00 | 0 | 30 |
| | | | | 1/4 | 60 |
| | | | | 1/2 | 90 |
| | | | | 5/8 | 120 |
| 8 | | | | 1 1/4 | 30 |
| | | | | 2 3/8 | 60 |
| | | | | 3 1/2 | 90 |
| | | | | 4 1/4 | 120 |
| 8 | | | 1.0 | 0 | 30 |
| | | | | 1/4 | 60 |
| | | | | 5/8 | 90 |
| | | | | 3/4 | 120 |
| 8 | | | 1.5 | 1 1/4 | 30 |
| | | | | 3 1/2 | 60 |
| | | | | 4 3/8 | 90 |
| | | | | 4 1/2 | 120 |
| 8 | | | 1.75 | 2 | 30 |
| | | | | 4 | 60 |
| | | | | 4 1/2 | 90 |
| | | | | 4 1/2 | 120 |
| 8 | | | 2.00 | 2 1/2 | 30 |
| | | | | 4 1/2 | 60 |
| | | | | 4 5/8 | 90 |
| | | | | 4 1/4 | 120 |

TABLE II.—Continued

| Formulation | Bentonite, percent | Attapulgus, percent | Flosal, percent | Settling (in.) | Time (min.) |
|---|---|---|---|---|---|
| 9 | | .75 | | None | 30 |
| | | | | None | 60 |
| | | | | Very Small | 120 |
| 9 | | 1.0 | | None | 30 |
| | | | | None | 60 |
| | | | | None | 120 |
| 9 | | 2.00 | | None | 30 |
| | | | | None | 60 |
| | | | | None | 120 |
| 10 | | .75 | | None | 30 |
| | | | | None | 60 |
| | | | | Very Small | 120 |

TABLE III.—PUMPING CHARACTERISTICS USING VARIOUS SUSPENDING AGENTS

| Formulation | Pump Rate, strokes/min. | Strokes per gal. | Viscosity in Centipoise | Surge Press. 3/4 in. hose (p.s.i.g.) | Surge Press. 1/8 in. Orifice (p.s.i.g.) |
|---|---|---|---|---|---|
| 2 | 40 | 62 | 278 | 35 | 100 |
| 2 | 40 | 40 | 98 | 35 | 100 |
| 7 (1.75% Flosal) | 40 | 84 | 300+ | 50 | 100 |
| 8 (1.0% Flosal) | 40 | 90 | 300+ | 50 | 100 |
| 9 (.75% Attapulgus) | 40 | 55 | 215 | 50 | 100 |
| 10 (.75% Attapulgus) | 40 | 52 | 177 | 50 | 100 |

Tests show that .75% by weight of Attapulgus 150 in both GEL and AP slurries will produce slurries with very similar viscosities. The suspending qualities of Attapulgus 150 in a .75% concentration appear to be quite good. Tests show that the amount of solids that can be expected after a 2-hour period in AP or gel slurries is negligible. Increasing the Attapulgus 150 concentration reduces the settling of solids very slightly. Slurries consisting of over a 1% concentration of Attapulgus 150 were too thick for normal grouting operations.

Neither Attapulgus 150 nor Flosal require prehydration.

Concentrations of one percent Flosal in AP slurries and 1.75% in GEL slurries, appear to be the optimum amounts for best suspending qualities. These optimum amounts of Flosal result in slurries of similar viscosities.

Additional laboratory tests were made for comparing Bentonite and Attapulgus 150 in sodium silicate slurries.

PROCEDURE

Small batches of a sodium silicate slurry were prepared by mixing the following materials:

Sodium silicate G40 _____ cc__ 50
Hydrochloric acid (20° Bé.) _____ cc__ 50
Silica flour _____ gm./cc__ 200–100
Suspending agent (either Bentonite or Attapulgus 150 in the percentages shown in Table IV).

In all tests, the suspending materials were added to either the sodium silicate or the mixture of sodium silicate and acid. The gel time and the amount of settling of each were recorded. Tests were conducted at room temperature and also at 100° F.

In tests similar to these, the asbestos fibers showed erratic suspending properties. Although these fibers may be used in sodium silicate slurries, they are not recommended for such use.

It can be appreciated that the present invention is not limited to any particular water soluble pre-polymer or gelling material, and that the particular gelling materials disclosed herein are by way of example only.

It can also be appreciated that this invention is not limited to the use of any particular finely divided inert or non-reactive solids, and that the particular inert solids disclosed herein are by way of example only.

It should be understood that the terms soil stabilization or soil stabilizer are intended to include methods of and compositions for grouting, consolidating of loose sands, fluid shut off, or any injection or introduction of a polymerizable solution into an earth formation.

Broadly, the present invention relates to a method of stabilizing soils or grouting, utilizing a slurry of a water soluble pre-polymer gelling material or other suitable consolidating fluid, containing a quantity of finely divided inert solids suspended in the slurry by a suspending agent having needle like crystals, with or without a surfactant, and which gelling material is polymerizable by a suitable catalyst which may be an integral part of the slurry or applied externally thereto.

What is claimed is:

1. A method of stabilizing earth formations which comprises injecting into the formation, an aqueous solution of a gelling material containing a quantity of finely divided inert solids and a quantity of a hydrous oxide of silicon, magnesium and/or aluminum characterized by a needle-like or acicular mode of crystallization as a suspending agent for the solids.

TABLE IV

| Equivalent Bbls. of Sod. Silicate per 100 Bbls. of Total Mix | Deg. F. | Additive | Percent Used | Degree of Settling | Time Noted Before Objectional Settling Occurred and Remarks | Gel Time (min.) |
|---|---|---|---|---|---|---|
| 8 | 100 | Bentonite | 10 | None | Thixotropic | 1,300 |
| 12 | 100 | do | 10 | do | do | 372 |
| 14 | 100 | do | 10 | do | do | 250 |
| 16 | 100 | do | 10 | do | do | 163 |
| 20 | 100 | do | 10 | do | do | 80 |
| 24 | 100 | do | 10 | do | do | 50 |
| 24 | 75 | Attapulgus 150 | 5 | do | Too thick to pump | 150 |
| 8 | 75 | do | 2.5 | do | do | (*) |
| 24 | 75 | do | 1 | do | Good mix | 43 |
| 24 | 75 | do | 1 | do | do | (*) |
| 12 | 100 | do | 1 | do | do | 329 |
| 14 | 100 | do | 1 | do | do | 211 |
| 16 | 100 | do | 1 | do | do | 141 |
| 20 | 100 | do | 1 | do | do | 79 |
| 24 | 100 | do | 1 | do | do | 56 |
| 20 | 75 | No additive | | Very large | 30 minutes | 171 |

*The gel times of these samples were not recorded.

2. The method of claim 1, wherein the suspending agent is a finely divided palygorskite clay.

3. The method of claim 1, wherein the suspending agent is a finely divided attapulgite clay.

4. The method of claim 1, wherein the suspending agent is finely divided asbestos fibers.

5. The method of claim 1, wherein the suspending agent particles have a density of from about 2.5 to 2.7 grams per cubic centimeter and a specific surface area of from about 4 to 150 square meters per gram.

6. A method of stabilizing early formations which comprises injecting into the formation an aqueous solution of a gelling material selected from the group consisting of sodium silicate, chrome lignin materials and an ethenoid monomer containing an acrylyl group, finely divided inert solids selected from the group consisting of silica flour, barite, bauxite, talc, scoria, diatomaceous earth, calcium carbonate, gilsonite and asphaltic pyrobitumens and a suspending agent selected from the group consisting of finely divided attapulgite clays and finely divided asbestos fibers.

7. The method of claim 6, wherein the ethenoid monomer has the formula:

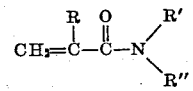

in which R is selected from the group consisting of hydrogen and methyl and R' and R" are selected from the group consisting of hydrogen and alkyl and a copolymerizable cross-linking material.

8. The method of claim 6, wherein said solids have a particle size of about 10 microns to about 180 microns and are present in an amount of about .25 absolute gallons to about 1.25 absolute gallons per gallon of aqueous solution.

9. A method of stabilizing earth formations which comprises injecting into the formation an aqueous solution of a copolymerizable mixture comprising an ethylenic monomer of the formula:

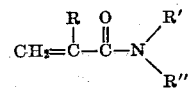

in which R is selected from the group consisting of hydrogen and methyl and R' and R" are selected from the group consisting of hydrogen and alkyl and a copolymerizable cross-linking material, a quantity of silica flour and a quantity of a suspending agent for the silica flour selected from the group of finely divided needle-like crystals consisting of attapulgite and asbestos.

10. The method of claim 9, wherein the cross-linking material is an alkylidene bisacrylamide of the formula:

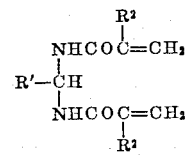

in which $$R'-\overset{|}{\underset{|}{C}}H$$

is a hydrocarbon residue of an aldehyde and $R^2$ is of the group consisting of hydrogen and methyl.

11. The method of claim 10, wherein said ethylenic monomer is present in the mixture in an amount of about 95–99% by weight, and said alkylidene bisacrylamide is present in the mixture in an amount of about 1–5% by weight.

12. A method of stabilizing or grouting soils, comprising the step of injecting into the soil or an opening therein, an aqueous solution of sodium silicate having suspended therein a quantity of silica flour and a quantity of a finely divided attapulgite clay as the suspending agent for the silica flour, and which solution is convertible in the presence of a catalyst to a substantially water insoluble mass.

References Cited

UNITED STATES PATENTS

| | | | |
|---|---|---|---|
| 2,807,324 | 9/1957 | King et al. | 166—29 |
| 3,136,360 | 6/1964 | Ramos et al. | 166—29 |
| 3,146,828 | 9/1964 | Mann | 166—29 X |
| 3,208,523 | 9/1965 | Coyle et al. | 166—29 |
| 3,223,163 | 12/1965 | Koch et al. | 166—33 |
| 3,253,664 | 5/1966 | Sauber et al. | 166—29 X |
| 3,286,475 | 11/1966 | Adams | 61—36 |
| 3,334,689 | 8/1967 | McLaughlin | 166—33 |
| 3,336,979 | 8/1967 | Ingraham et al. | 166—33 |

STEPHEN J. NOVOSAD, *Primary Examiner.*

UNITED STATES PATENT OFFICE
CERTIFICATE OF CORRECTION

Patent No. 3,374,834                                March 26, 1968

Joseph Ramos et al.

It is certified that error appears in the above identified patent and that said Letters Patent are hereby corrected as shown below:

Column 2, lines 60 and 61, "preferable" should read -- preferably --; line 62, ".15" should read -- .25 --. Column 7, line 1, "early" should read -- earth --.

Signed and sealed this 6th day of January 1970.

(SEAL)
Attest:

Edward M. Fletcher, Jr.                        WILLIAM E. SCHUYLER, JR.
Attesting Officer                                  Commissioner of Patents